(12) United States Patent
Van Esch

(10) Patent No.: US 6,575,349 B2
(45) Date of Patent: Jun. 10, 2003

(54) METHOD OF APPLYING BRAZE MATERIALS TO A SUBSTRATE

(75) Inventor: Hans Van Esch, Seabrook, TX (US)

(73) Assignee: Hickham Industries, Inc., La Porte, TX (US)

( * ) Notice: Subject to any disclaimer, the term of this patent is extended or adjusted under 35 U.S.C. 154(b) by 39 days.

(21) Appl. No.: 09/791,951

(22) Filed: Feb. 22, 2001

(65) Prior Publication Data

US 2002/0153405 A1 Oct. 24, 2002

(51) Int. Cl.[7] .................. B23K 31/02; C23C 4/00; B23P 6/04
(52) U.S. Cl. .............. 228/119; 228/260; 427/142; 427/456; 29/889.1
(58) Field of Search ............... 228/119, 199, 228/256, 260, 261; 427/456, 142; 29/889.1

(56) References Cited

U.S. PATENT DOCUMENTS

| | | | |
|---|---|---|---|
| 4,705,203 A | | 11/1987 | McComas et al. |
| 4,743,462 A | * | 5/1988 | Radzavich et al. ......... 427/282 |
| 5,151,308 A | | 9/1992 | Moskowitz et al. |
| 5,156,321 A | | 10/1992 | Liburdi et al. |
| 5,268,045 A | * | 12/1993 | Clare .................. 148/518 |
| 5,732,467 A | | 3/1998 | White et al. |
| 5,956,845 A | * | 9/1999 | Arnold .................. 29/402.07 |
| 6,004,362 A | * | 12/1999 | Seals et al. ............... 427/299 |
| 6,050,477 A | | 4/2000 | Baumann et al. |
| 6,071,324 A | * | 6/2000 | Laul et al. ............... 148/410 |
| 6,136,453 A | | 10/2000 | Ritter et al. |
| 6,210,812 B1 | * | 4/2001 | Hasz et al. ............. 416/241 B |
| 6,233,822 B1 | * | 5/2001 | Grossklaus, Jr. et al. 29/402.01 |
| 2002/0098294 A1 | * | 7/2002 | Lau et al. |

FOREIGN PATENT DOCUMENTS

| | | |
|---|---|---|
| EP | 1013788 | 6/2000 |
| EP | 1065297 | 1/2001 |
| WO | WO 00/17490 | 3/2000 |

\* cited by examiner

Primary Examiner—Tom Dunn
Assistant Examiner—Kiley Stoner
(74) Attorney, Agent, or Firm—Francis C. Hand; Carella, Byrne et al.

(57) ABSTRACT

A HVOF process is used for applying brazing materials to repair surfaces of a substrate such as a turbine blade. The brazing material is applied in powdered form and is free of binders and adhesives. The brazing materials may be any one or more of a nickel based, cobalt based or ferrous based high temperature brazing material. Alloys of these elements may be used together with a temperature depressing melting point element such as boron or silicon.

16 Claims, 2 Drawing Sheets

METHOD OF APPLYING BRAZE MATERIALS TO A SUBSTRATE

This invention relates to a method of applying braze material to a substrate. More particularly, this invention relates to a repair deposit on a substrate.

As is known, various types of turbomachinery components, such as steam and gas turbine blades and vanes that are used in environments which are detrimental to the components. For example, the environments in which these components operate cause dimensional reduction of the wall thicknesses of the components by erosion, high temperature, oxidation and hot corrosion or a combination of these factors. In addition, cracks may occur from time-to-time due to thermal fatigue. Over time, these cracks may grow to significant length and width.

Because of the high cost of producing these turbomachinery components, expensive repair methods have been economically justified. Typically, high temperature brazing is used extensively for the repair of these components. For example, compressors may be subject to a high temperature brazing such as described in ASME 97-GT-372.

High temperature brazing materials based on nickel (Ni), cobalt (Co) or a ferrous material (Fe) together with melting point depressing elements, such as silicon (Si) and boron (B) have been used for some time for brazing honeycomb seals and repairing small cracks. For wide cracks and wall thickness restoration, wide gap brazes have been developed, for example as described in Turbomachinery, September 1986. These brazes consist partly of a braze material as described above combined with a super alloy metal powder that does not melt during a brazing run. This allows the brazing of a wide gap and the restoration of a wall thickness to be accomplished.

Wide gap brazes also improve the properties, such as ductility and oxidation resistance, of the high temperature brazing material as compared to a conventional braze product.

The newer repair technologies employ an increasing use of a base material by partly alloying a super alloy with a melting point depressing element, such as silicon or boron, for example, as described in ASME 00-GT-500.

Generally, before a high temperature brazing material may be applied to a substrate, the substrate must be carefully cleaned. Cleaning may be accomplished mechanically, by grit cleaning or by blending with a belt abrasive combined with various degreasing methods. The substrate may also be cleaned in a chemical bath at ambient and at elevated temperatures such as described in Turbomachinery, January 1996. Special cleaning processes have also been developed at high temperatures in vacuum, hydrogen and a fluoride/hydrogen environment.

In the past, high temperature brazing materials have been applied with a binder, in a so-called "slurry". However, such a binder usually consists of elements, such as oxygen or carbon, which may adversely influence the quality of the brazing.

Plasticized powdered metal alloy tapes have also been used in order to make the application of the brazing material easier. However, the use of such tapes has not improved the quality of the brazing.

In other techniques, a pre-sintered alloy tape has been used in order to reduce the need for a binder and/or an adhesive and thereby produce a better braze. If applied with a resistance welding technique, a pre-sintered alloy needs no binder or adhesive. This allows an improvement in the quality of the final braze significantly but commercial preforms are only available in plate form and need to be cut by laser or high-pressure water. Also, for some applications, a three dimensional preform is required. This makes the application of this technique, if possible at all, extremely expensive.

Except for sintering, air plasma sprays and even vacuum plasma brazes have been used to make preforms. Although no binder or adhesive needs to be used with either method, air plasma introduces porosity and oxidation products into the repair deposit. Spraying high temperature brazing materials by vacuum and air plasma also create another problem called "element migration". Migration is caused when certain elements, such as boron and carbon, are vaporized out of the mixture. Migration may be compensated by adding more of those elements in the initial high temperature brazing material. However, migration prediction is unreliable thereby making the content of the critical elements inconsistent.

Generally, a heat treatment step is used to complete a brazing operation. Normally, the heat treatment step is performed under vacuum or other protective atmosphere. During a typical braze heat treatment, the binder/adhesive which is used with the brazing materials is degraded and become gaseous. After this, the temperature of the component being repaired is stabilized just below the solidus temperature of the braze. The furnace in which the heat treatment is being performed is then quickly brought to the actual brazing temperature for a short time and then slowly lowered. A diffusion heat treatment may also be included after the braze heat treatment.

After heat treatment, inspection of the braze quality takes place and the process repeated if required.

As is known, while a coating is applied to a base material in order to improve the resistance of the base material to the environment, braze material is applied for the purpose of restoring the shape and material properties, including the mechanical properties of the base material. It is important to restore the resistance to stresses and/or restore critical dimensions lost by a reduction in wall thickness or other defects.

U.S. Pat. No. 6,136,453 describes a thermal barrier coating system for applying a bond coat to a substrate. As described, the bond coat may be disposed on a substrate employing thermal spray processes, such as vacuum plasma spray (VPS or LPPS), air plasma spray (APS) and hypervelocity oxy-fuel (HVOF) spray processes. As further described, the structure and roughness of the bond coat surface are dependent on the spray process. Bond coats deposited by HVOF are sensitive to particle size distributions. Dense and oxide-free bond coats can be deposited by HVOF using very lean conditions and finer particles. Rough bond coats deposited by HVOF using coarser powders require a low temperature which results in unmelted powders. Therefore, the coating is porous and less dense.

U.S. Pat. No. 5,735,448 describes a method of repairing surface and near surface defects in super alloy articles such as gas turbine engine components. As stated therein, brazing techniques have been employed to repair defective areas. However, difficulties encountered with this technique and variations thereof include the inability to completely remove contamination in the cracks and inability to completely fill narrow cracks with braze material. In order to overcome the problem, the use of a specific repair coating is described.

U.S. Pat. No. 5,151,308 describes a high density spray coating. In particular, use is made of accessory apparatus attachable to the nozzle of a supersonic velocity thermal spray gun which uses oxy fuel (propylene) products of combustion. The use of an inert gas shield confined within a metal shroud attachment which extends coaxially from the outer end of a thermal spray gun nozzle is said to reduce total volume fractions of porosity and oxide from a normal range of 3% to 50% to a level of less than 2%.

U.S. Pat. No. 5,915,743 describes a metal spray tool repair system which employs a mask in a thermal spraying process.

Accordingly, it is an object of this invention to reduce the need for brazing material or melting point depressing elements and thereby improve the properties of a high temperature braze material significantly.

It is another object of the invention to eliminate the use of binders or adhesives in a high temperature brazing material.

It is another object of the invention to reduce oxidation products from a repair deposit of high temperature brazing material.

It is another object of the invention to eliminate carbon deposits from a repair made using high temperature brazing material.

It is another object of the invention to eliminate or reduce to a minimum the migration of critical elements, such as boron and carbon, in applying a high temperature braze material to a substrate.

It is another object of the invention to reduce oxidation products and porosity during application of high temperature brazing materials when applied with air plasma spray techniques.

It is another object of the invention to very accurately apply a high temperature brazing material to a desired thickness using a robot.

It is another object of the invention to eliminate shrinkage and river forming in applying a high temperature brazing material.

It is another object of the invention to eliminate the need of a preform in applying repair deposited on a high temperature brazing material.

It is another object of the invention to reduce the adverse effect on quality of the finished brazed product caused by the environment during a brazing heat treatment.

It is another object of the invention to provide a method of applying braze materials at reduced production costs and lead time.

Briefly, the invention is directed to a method of applying braze materials to a substrate employing a high velocity combustion gas stream and in particular a HVOF technique.

In particular, the method is directed to the repairing of various types of substrates which require repair, for example surface cracks and corroded areas. In accordance with the method, a high velocity combustion gas stream is generated and a binder-free high temperature brazing material is passed into the gas stream in order to entrain and melt the brazing material therein. The brazing material entrained gas stream is then directed against and along at least one portion of the substrate requiring repair in order to form a deposit of brazing material thereon. Thereafter, the substrate is heat treated.

Typically, the high velocity combustion gas stream is generated by employing a Diamond Jet Hybrid 2600 spray gun for a hydrogen fuel and a Diameter Jet Hybrid 2700 spray gun for a natural gas fuel. These guns are manufactured and sold by Sulzer Metco (US) Inc. of Westbury, N.Y.

The binder-free high temperature brazing material is selected from the group consisting of at least one of a nickel-based, cobalt-based and ferrous-based brazing material. The brazing material may also be selected from the group consisting of these brazing materials and at least one of a nickel alloy, cobalt alloy and ferrous alloy. Further, where the high temperature brazing material is one of these alloys, there may also be at least one temperature depressing melting point element, such as boron and/or silicon. Also, the brazing material may be made of any combination of these components.

The brazing material in powdered form is passed into the gun using a conventional powder feeder such as a 9MP DJ (a Diamond Jet powder feeder) sold by Sulzer Metco (US) Inc. of Westbury, N.Y.

The carrier gas used in such a powder feeder is typically nitrogen supplied at a pressure of 150 psi. The flow rate for the brazing material which is in powder form is typically 28 or 30 SCFH with a spray rate of from 5 grams per minute to 50 grams per minute and typically 30 grams per minute (g/min).

The spray gun is typically spaced from the substrate a distance of 10 inches and the spray rate is adjusted to give an application rate of less than 0.2 to 0.4 mil per pass.

The thickness of the applied deposit of brazing material may range from 0.030 to 0.040 inches and even to thicknesses in excess of 0.100 inches.

The heat treatment which is performed on the substrate after depositing of the brazing material is conventional. Typically, the heat treatment is performed within a vacuum furnace. In some cases, the brazing or diffusion step can be eliminated.

The repair deposit(s) laid down in accordance with the method is characterized in being binder free and carbon free. In particular, the repair deposit(s) is characterized in having a porosity of less than 2% and in particular, less than 1%.

The invention also provides a repair deposit of unique characteristics as noted above. That is to say, the invention provides a repair deposit comprised of a high temperature brazing material which is characterized in being binder-free and having a porosity of less than 2%.

These and other objects and advantages of the invention will become more apparent from the following detailed description taken in conjunction with the accompanying drawings wherein.

Figure 1:
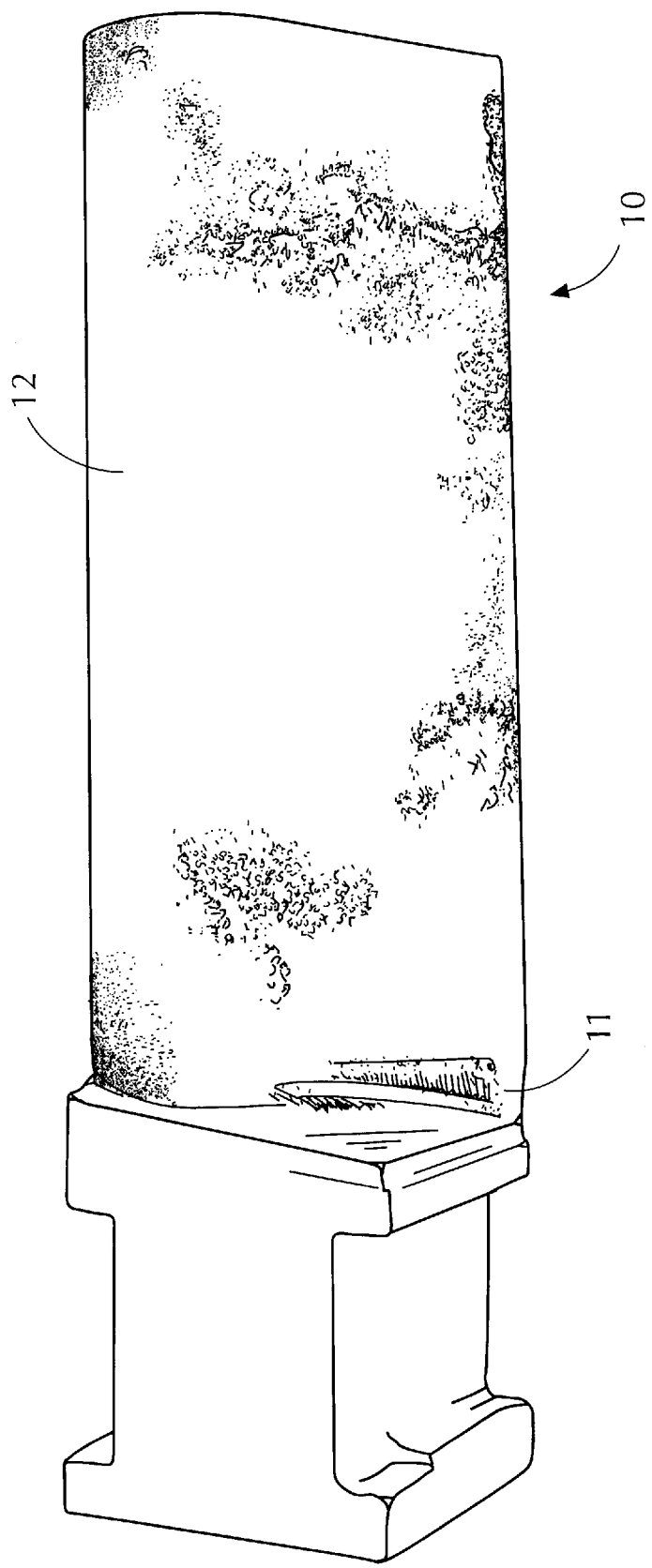
FIG. 1 illustrates a turbine blade having multiple areas thereof requiring repair.

The method of applying braze materials to a substrate in accordance with the invention is described below with respect to a turbine blade, such as illustrated in FIG. 1. Such a turbine blade may be used in turbomachinery, such as an expander or gas turbine. Further, the blade may be used as part of a rotor or as part of a stator.

As illustrated in FIG. 1, the turbine blade 10 has a root 11 for mounting in a rotor or stator (not shown) and a vane 12 extending from the root 11. As illustrated, the vane 12 has a plurality of areas or portions thereof which require repair. These areas include surface cracks, pitting, eroded and corroded surfaces and edges.

In order to repair the surfaces and areas of the vane requiring repair, use is made of a high velocity oxygen fuel (HVOF) techniques presently known as High Pressure or Third Generation (HVOF). Typically, this process has been used for applying coatings over the entire surface of a substrate for purposes of protecting the substrate against the environment in which the substrate is used. The technique has not been used for brazing purposes, that is, for purposes of repairing cracks, surface cracks, pitting, corrosion and erosion of surfaces and edges.

In order to repair the vane 12, the turbine blade 10 is cleaned, particularly, the surfaces of the vane 12 which are to be repaired. Any suitable cleaning technique may be employed for this purpose.

After cleaning, use is made of a spray gun to generate a high velocity combustion gas stream. Examples of suitable guns are a Diamond Jet Hybrid 2600 which employs a hydrogen fuel and a Diamond Jet Hybrid 2700 which employs a natural gas fuel.

In addition, the brazing material which is employed is of the high temperature type which is binder-free and adhesive-free. Preferably, the brazing material is selected from one or more of the following groups:

A. A group consisting at least one of a nickel-based, cobalt-based and ferrous-based material.

B. A group consisting of at least one of a nickel-based brazing material, a cobalt-based brazing material and a ferrous-based brazing material wherein the brazing material includes at least one temperature depressing melting point element including but not limited to the group consisting of boron and silicon.

C. A group consisting of at least one of a nickel alloy, cobalt alloy and ferrous alloy and at least one temperature depressing melting point element including but not limited to the group consisting of boron and silicon.

D. Any combination of the materials of the groups A, B and C.

The brazing material is typically supplied in powdered form. Examples of the brazing materials are DF3/IN738 (an AMDRY® activated diffusion brazing filler metal sold by Sulzer Plasma Technik, Inc. of Troy, Mich.), MAR-M-509 (an AMDRY® nickel and cobalt superalloy metal powder sold by Sulzer Plasma Technik, Inc.) and MAR-M509B.

The brazing material is passed into the gas stream within the gun in order to entrain and melt the brazing material therein. Typically, a carrier gas such as nitrogen is used to carry the powdered brazing material into a combustion chamber of the gun.

The construction of the spray gun is well known and need not be further described. Typically, the spray gun is used manually within a hooded and vented chamber to spray the brazing material onto the surfaces of the substrate to be repaired.

The spray gun may also be mounted on a robot which is controlled by an operator.

The gun is used to direct the brazing material entrained gas stream against and along the portions of the turbine vane 12 which require repair in order to form a deposit of brazing material on each portion. Typically, the spray gun is moved to give an application of less than 0.2 to 0.4 mil per pass for each deposit.

After several passes, the spray gun is deactivated and the turbine blade 10 subjected to a heat treatment step. The heat treatment step may be of conventional type.

Upon cooling, the turbine blade 10 is inspected for braze quality and the process repeated if required.

Normally, heat treatment is performed under vacuum in a vacuum furnace or other protective atmosphere. Since there are no binders or adhesives in the brazing material, the repair deposit does not degrade and no gases are evolved.

The turbine blade 10 is then placed in the vacuum furnace. The furnace is then heated at a rate of 50° F. per minute until reaching 1975° F. This temperature is held for 30 minutes. Next, the furnace is heated at a rate of 75° F. per minute until reaching 2150° F. This temperature is held for 15 minutes. Next, the furnace is cooled until reaching 1950° F. and held at this temperature for at least two hours. Thereafter, the furnace is cooled to ambient temperatures.

A diffusion treatment may also be carried out thereafter at a furnace temperature of 1950° F. for at least two hours. The purpose of the diffusion heat treatment is to lower the concentration of certain elements, such as boron and/or silicon, in the braze material.

After cooling, the turbine blade is inspected.

The following examples are provided of the conditions and parameters used for applying braze materials to a portion of a surface of a turbine vane requiring repair.

EXAMPLE 1

| Coating Type: | HVOF BRAZE |
|---|---|
| Powder(s): | DF3/IN738 |
| Item | |
| Gun | DJ2600 |
| Powder Injector | #8 |
| Shell | #8 |
| Insert | #8 |
| Distribution Plug | #8 |
| Air Cap | DJ2603 |
| Gases | $O_2/H_2/N_2$ |
| Pressure (psi) | 170/140/100 |
| Flow, FMR | 29/55/50 |
| Powder Feeder | 9MP-DJ |
| Carrier Gas | Nitrogen |
| Pressure, psi | 150 |
| Flow, SCFH | 28 |
| Spray rate, g/min | 30 |
| Spray Distance, in. | 10 |
| Coating Thickness | 0.03" |

Figure 2:
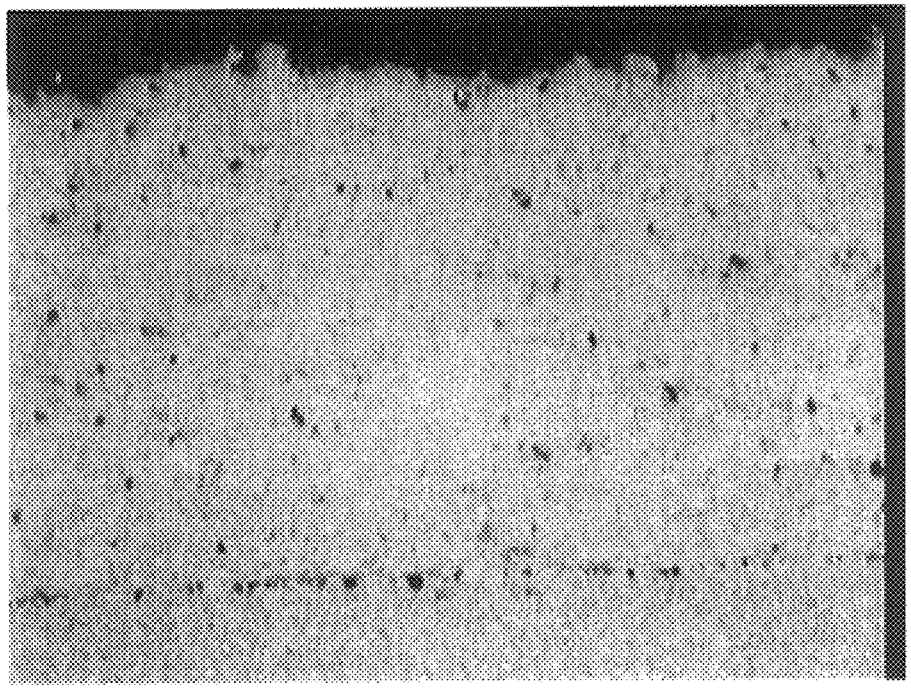
FIG. 2 illustrates a photomicrograph of a repair deposit effected by one embodiment of the invention.

FIG. 2 is a photomicrograph of the repair deposit taken in cross section and showing the typical structure enlarged 100 times, as polished.

An inspection of the photomicrograph shows the following:

| | Actual |
|---|---|
| Porosity (stand. proc.) | 2% |
| Unmelted Particles | N/A |
| Interface Grit Entrapment | 2% |
| Delamination | None |
| Cracks | None |

EXAMPLE 2

| Coating Type: | HVOF BRAZE |
|---|---|
| Powder(s): | MAR-M-509 |
| Item | |
| Gun | DJ2600 |
| Powder Injector | #8 |
| Shell | #8 |
| Insert | #8 |
| Distribution Plug | #8 |
| Air Cap | DJ2603 |
| Gases | $O_2/h_2/N_2$ |

-continued

| Coating Type: | HVOF BRAZE |
| --- | --- |
| Powder(s): | MAR-M-509 |
| Pressure (psi) | 170/140/100 |
| Flow, FMR | 29/55/50 |
| Powder Feeder | 9MP-DJ |
| Carrier Gas | Nitrogen |
| Pressure, psi | 150 |
| Flow, SCFH | 28 |
| Spray rate, g/min | 30 |
| Spray Distance, in. | 10 |
| Coating Thickness | 0.030" |

Figure 3:
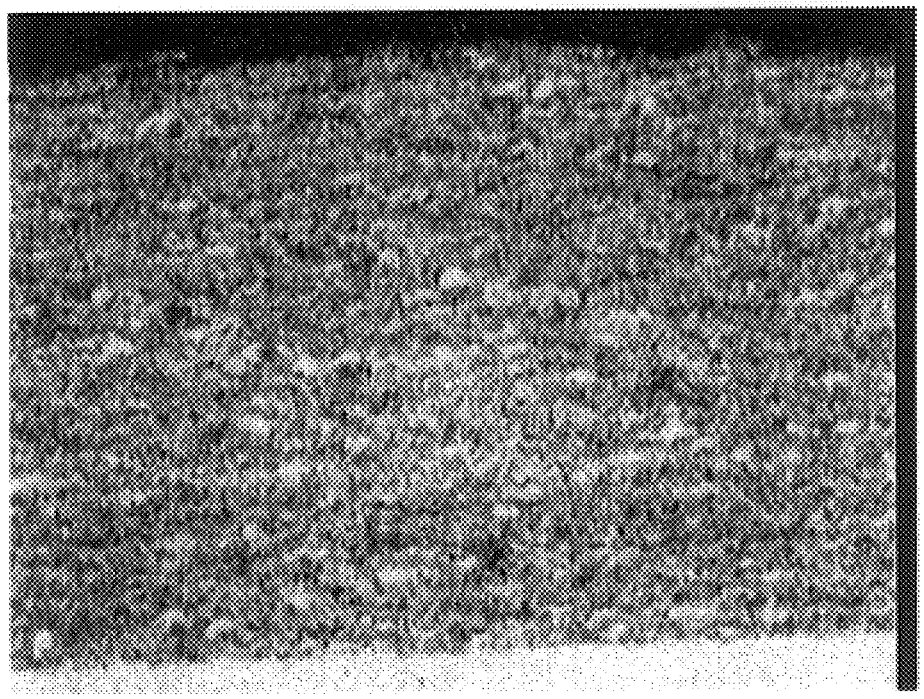
FIG. 3 illustrates a photomicrograph of a repair deposit effected in accordance with a modified technique in accordance with the invention.

FIG. 3 is a photomicrograph taken in cross sectional view enlarged 100 times of a deposit made in Example 2 and shows the following results:

|  | Actual |
| --- | --- |
| Porosity (stand. proc.) | <1% |
| Unmelted Particles | N/A |
| Interface Grit Entrapment | <1% |
| Delamination | None |
| Cracks | None |

The invention thus provides a method of applying high temperature braze or brazing materials which eliminates the need for binders and/or adhesives. By this elimination, the porosity and oxidation products are significantly reduced. In addition, carbon deposits are eliminated. All of these actions results in a better brazed product as compared to an application using a powder metal slurry, plasticized powdered metal or a pre-sintered alloy tape.

In addition, the method eliminates or reduces to a minimum the migration of critical elements such as boron. The method also eliminates shrinkable and river forming which occurs, for example which occurs using a powder metal slurry or a plasticized powdered metal alloy tape.

The invention allows the thickness of the repair deposit to be varied. The method also allows the thickness of the repair deposits to be in excess of 0.100 inch.

The invention provides an economical method for obtaining a high quality repair of a substrate such as turbomachinery components and particularly turbine blades and vanes. The method is particularly useful for repairing cracks, surface defects and corroded and eroded areas of a turbine vane.

What is claimed is:

1. A method of applying braze materials to a substrate, said method comprising the steps of
   obtaining a substrate requiring repair;
   generating a high velocity combustion gas stream;
   passing binder-free high temperature brazing material into said gas stream to entrain and melt the brazing material therein;
   directing the brazing material entrained gas stream against and along at least one portion of the substrate requiring repair to form a deposit of brazing material thereon; and
   thereafter heat treating the substrate to bring the brazing material to a brazing temperature and then lowering the temperature.

2. A method as set forth in claim 1 wherein the brazing material is selected from the group consisting of at least one of nickel-based, cobalt-based and ferrous-based brazing material.

3. A method as set forth in claim 1 wherein the brazing material is selected from the group consisting of at least one of a nickel alloy, cobalt alloy and ferrous alloy and at least one temperature depressing melting point element.

4. A method as set forth in claim 3 wherein said temperature depressing melting point element is selected from the group consisting of boron and silicon.

5. A method as set forth in claim 1 wherein said brazing material is passed into said gas stream in powder form.

6. A method as set forth in claim 1 wherein said deposit has a thickness of from 0.030 inches to 0.040 inches.

7. A method as set forth in claim 1 wherein said deposit has a thickness of at least 0.100 inch.

8. A method as set forth in claim 1 wherein said step of heat treating is conducted in a vacuum furnace.

9. A method as set forth in claim 1 wherein said gas stream is generated from hydrogen gas.

10. A method as set forth in claim 1 wherein said gas stream is generated from natural gas.

11. A method as set forth in claim 2 wherein the brazing material includes an alloy selected from the group consisting of at least one of a nickel alloy, cobalt alloy and ferrous alloy.

12. A method as set forth in claim 11 wherein the brazing material includes at least one temperature depressing melting point element.

13. A method as set forth in claim 1 wherein said gas stream is directed at the substrate at an application rate of less than 0.4 mil per pass.

14. A method of repairing a turbine blade having at least one surface crack therein, said method comprising the steps of
   generating a high velocity combustion gas stream;
   passing binder-free high temperature brazing material into said gas stream to entrain and melt the brazing material therein;
   directing the brazing material entrained gas stream against and along the crack in the turbine blade to form a deposit of brazing material in the crack; and
   thereafter heat treating the turbine blade to bring the brazing material to a brazing temperature and then lowering the temperature.

15. A method as set forth in claim 14 wherein the brazing material is selected from the group consisting of at least one of nickel-based, cobalt-based and ferrous-based brazing material.

16. A method as set forth in claim 14 wherein said repair deposit is characterized in being binder-free and carbon-free and in having a porosity of less than 2%.

* * * * *